(12) United States Patent
Shi et al.

(10) Patent No.: US 8,537,906 B2
(45) Date of Patent: Sep. 17, 2013

(54) METHOD AND APPARATUS FOR ACKNOWLEDGMENT DETECTION DURING PREAMBLE TRANSMISSION

(75) Inventors: Jun Shi, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 698 days.

(21) Appl. No.: 12/692,056

(22) Filed: Jan. 22, 2010

(65) Prior Publication Data

US 2011/0182370 A1    Jul. 28, 2011

(51) Int. Cl.
*H04L 27/00* (2006.01)

(52) U.S. Cl.
USPC ............ 375/259; 370/328; 370/329

(58) Field of Classification Search
USPC .......... 370/278, 328, 329, 335, 423, 445; 375/259
See application file for complete search history.

(56) References Cited

U.S. PATENT DOCUMENTS

| | | | |
|---|---|---|---|
| 2002/0093918 A1* | 7/2002 | Kim et al. | 370/278 |
| 2007/0254643 A1* | 11/2007 | Garcia et al. | 455/423 |
| 2009/0154485 A1* | 6/2009 | Park et al. | 370/438 |
| 2009/0161635 A1* | 6/2009 | Kanterakis et al. | 370/335 |
| 2012/0236880 A1* | 9/2012 | Stadelmeier et al. | 370/498 |

OTHER PUBLICATIONS

International Search Report and Written Opinion—PCT/US2010/061902, International Search Authority—European Patent Office—Mar. 21, 2011.

Sangsoon Lim, et al., "Performance enhancement of low power listening MAC for duty cycled wireless sensor networks", Information Networking, 2009, ICOIN 2009, International Conference on, IEEE, Piscataway, NJ, USA, Jan. 21, 2009, pp. 1-5, XP031451459, ISBN: 978-89-960761-3-1.

Tae Rim Park, et al., "Design and analysis of asynchronous wakeup for wireless sensor networks", IEEE Transactions on Wireless Communications, IEEE Service Center, Piscataway, NJ, US, vol. 8, No. 11, Nov. 1, 2009, pp. 5530-5541, XP011284802, ISSN: 1536-1276, DOI: D0I:10.1109/TWC.2009.080814.

* cited by examiner

*Primary Examiner* — Leon-Viet Nguyen
(74) *Attorney, Agent, or Firm* — Paul S. Holdaway

(57) ABSTRACT

A method for wireless communication is disclosed, the method including transmitting a plurality of preambles; and detecting an acknowledgement to one of the preambles during the transmission of another one of the preambles. An apparatus for performing the method is also disclosed.

14 Claims, 7 Drawing Sheets

METHOD AND APPARATUS FOR ACKNOWLEDGMENT DETECTION DURING PREAMBLE TRANSMISSION

BACKGROUND

I. Field

The following description relates generally to communication systems, and more particularly to a method and apparatus for acknowledgment detection during preamble transmission.

II. Background

In certain wireless systems, before two devices can communicate, they must be paired. The pairing process typically includes an acquisition process. Preamble sequences for wireless communications are used as part of the acquisition process. The purpose of the preamble is to allow time for the receiver in each wireless device to achieve lock of the receiver's Digital Phase Lock Loop, which is used to synchronize the receive data clock to the transmit data clock. At the point when the first bit of the preamble is received, each receiver may be in an arbitrary state. During the course of detecting the preamble, it learns the correct phase, but in doing so it may need to acquire a number of samples. Once the receiver has acquired the preamble, it will transmit an acknowledgement (ACK).

The wireless device may need to transmit multiple copies of a preamble before it receives an ACK from another wireless device. Once an ACK has been detected, the wireless device can then stop transmitting the preamble and then continue on to transmitting the payload. During the transmission of the preamble, the wireless device cannot receive an ACK. Thus, the process may be lengthy if the preamble is long and/or the duty cycle between the transmission of the preamble and waiting for the ACK is short.

Consequently, it would be desirable to address one or more of the deficiencies described above.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to apparatus and methods that provide wireless communications, where a method for wireless communications includes transmitting a plurality of preambles; and detecting an acknowledgement to one of the preambles during the transmission of another one of the preambles.

In another aspect, an apparatus for wireless communications is provided that includes a processing system configured to transmit a plurality of preambles; and detect an acknowledgement to one of the preambles during the transmission of another one of the preambles.

In yet another aspect, an apparatus for wireless communications is provided that includes means for transmitting a plurality of preambles; and means for detecting an acknowledgement to one of the preambles during the transmission of another one of the preambles.

In yet another aspect, a computer-program product for wireless communications is provided that includes a machine-readable medium comprising instructions executable to transmit a plurality of preambles; and detect an acknowledgement to one of the preambles during the transmission of another one of the preambles.

In yet another aspect, a sensing device is provided that includes a sensor configured to generate sensed data; and a processing system coupled to the sensor, and configure to transmit a plurality of preambles; and detect an acknowledgement to one of the preambles during the transmission of another one of the preambles to establish communications for subsequent communication of the sensed data.

In yet another aspect, a headset is provided that includes a transducer; a processing system coupled to the transducer and configured to transmit a plurality of preambles; and detect an acknowledgement to one of the preambles during the transmission of another one of the preambles to establish communications for subsequent communication of data usable by the transducer.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents

DETAILED DESCRIPTION

Figure 1:
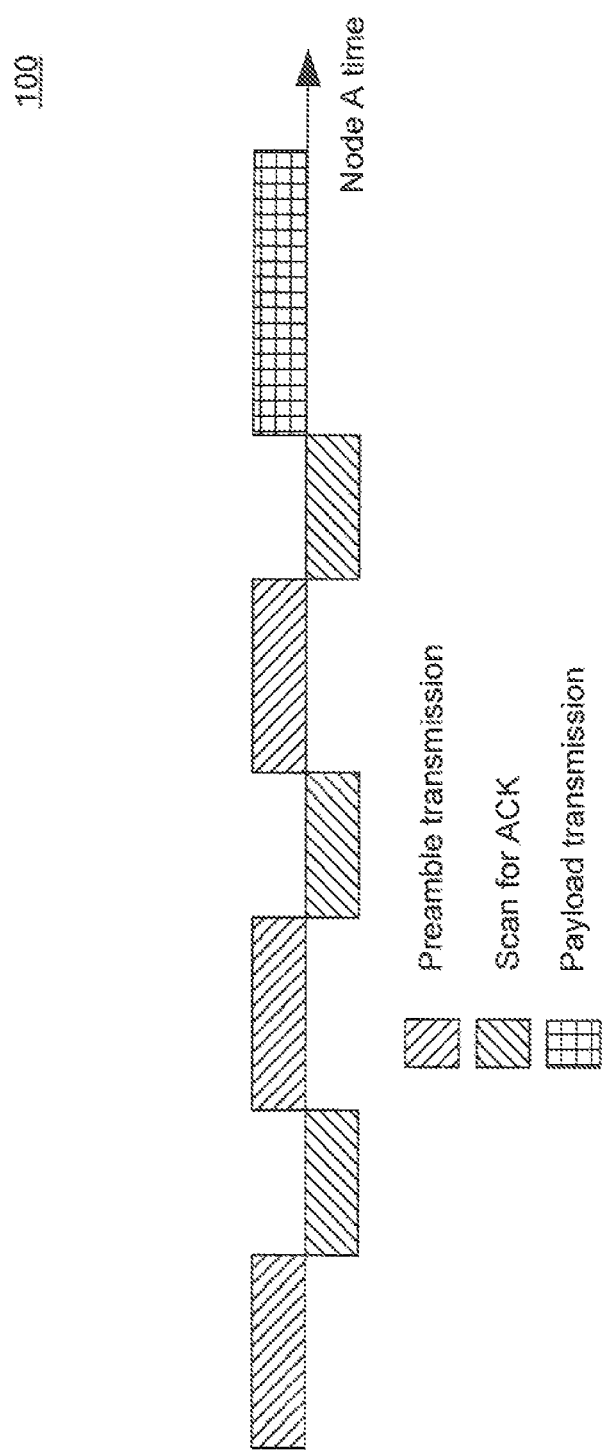
FIG. 1 is a diagram of a traditional preamble transmission and detection scheme.

Various aspects of the novel systems, apparatus and methods are described more fully hereinafter with reference to the accompanying drawings. The teachings disclosed herein may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Devices utilize a preamble sequence at the beginning of each packet. The preamble is used during the establishment of communications between two devices. In the most general form, the acquisition preamble consists of a sequence of pulses, each pulse being placed in one out of several positions to implement a hopping sequence, where each pulse can represent a "0" or "1". The pulse sequence may be transmitted a predetermined number of times to allow for other devices to acquire the preamble.

At a receiver, the incoming signal is sampled such that a predetermined number of binary samples are collected from one hop interval. For each repetition of a preamble, the receiver may collect several thousands of samples. The receiver begins the sample collection process at a random point during the preamble transmission and tries to identify the starting point of the preamble sequence. The receiver must test each of the hypotheses to determine how to receive the preamble. In addition, the device that is transmitting the preamble cannot receive during the transmission of the preamble. Thus, while the receiver is attempting to identify and acknowledge the preamble, it is expending power.

In devices that have two modes of communication, such as low/high SNR modes, devices will need a higher number of pulses in low SNR than in high SNR environments (256 pulses versus 64 pulses). Consequently, devices operating in low SNR environments require a longer time interval to acquire, which is exacerbated by clock drift. Further, devices in a low SNR environment require higher power to communicate effectively because SNR is a function of link budget. Specifically, when SNR is low, the devices also need to boost transmission power. Thus, longer time to achieve acquisition increases power consumption for the transmitter of the preamble as well as the receiver.

A traditional preamble transmission and acknowledgement scheme is illustrated in FIG. 1, where a wireless device, such as a wireless device A, sends a preamble then searches for an acknowledgment from another wireless device, such as a wireless device B, afterwards. If no acknowledgment packet is found, it continues to send the preamble. If acknowledgement is found, it moves on to transmitting payload. When the preamble and acknowledgement packet are long, this procedure suffers from long acquisition time.

Figure 2:
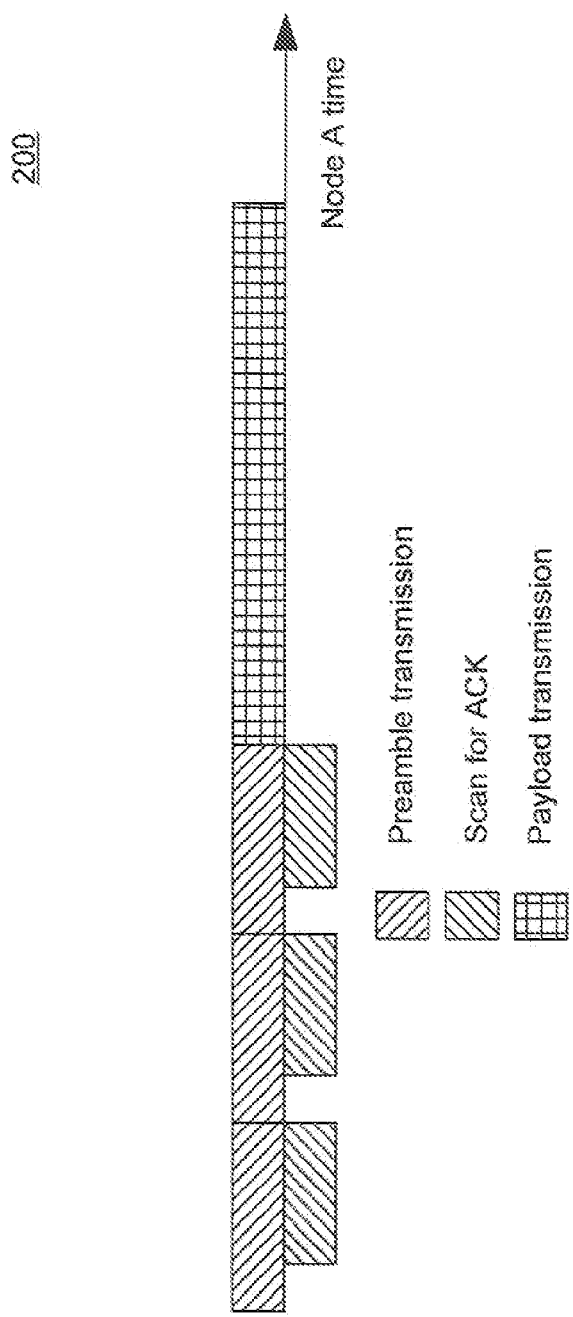
FIG. 2 is a diagram of a preamble transmission and detection scheme configured in accordance with an aspect of the disclosure.

Instead of transmission-then-search, in one aspect of the current disclosure a wireless device may be configured to search for an acknowledgment while transmitting a preamble, as shown in FIG. 2. This is possible if the transmission duty cycle is low while leaving the pulse repetition time long. The collision between transmission and reception may be totally avoided if the preamble and acknowledgement packet are designed to match. The acknowledgement packet can be shortened as compared to the preamble to allow wireless device B some processing time. The proposed approach reduces acquisition time and saves power consumption.

Figure 3:
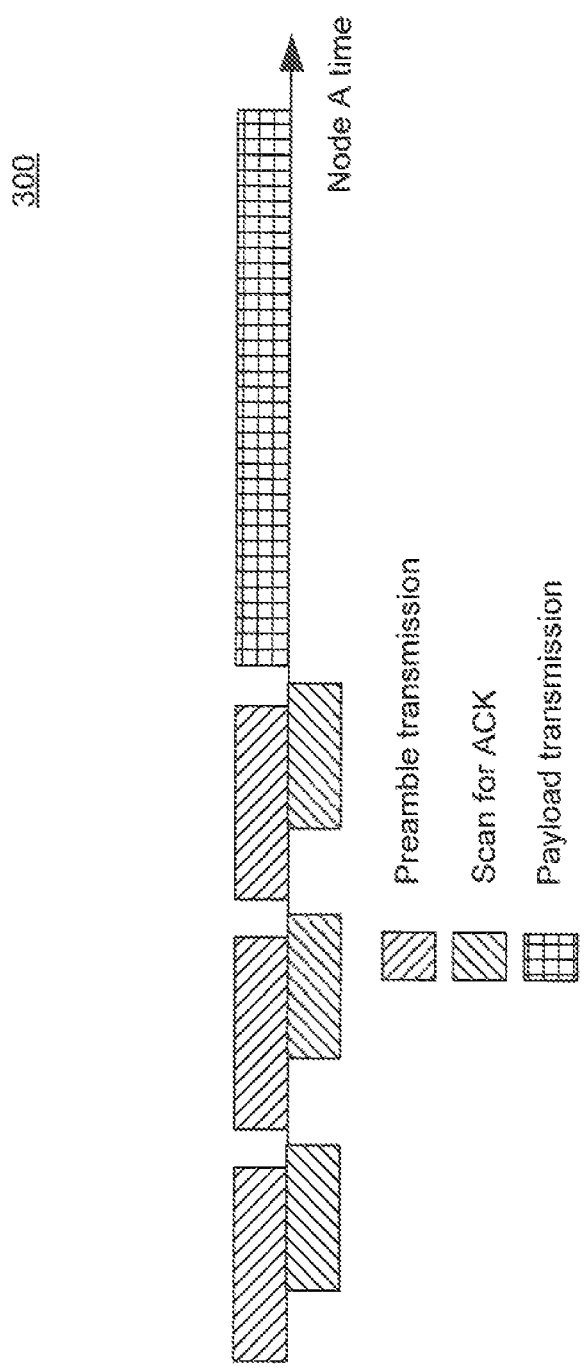
FIG. 3 is a diagram of another preamble transmission and detection scheme configured in accordance with an aspect of the disclosure.
Figure 4:
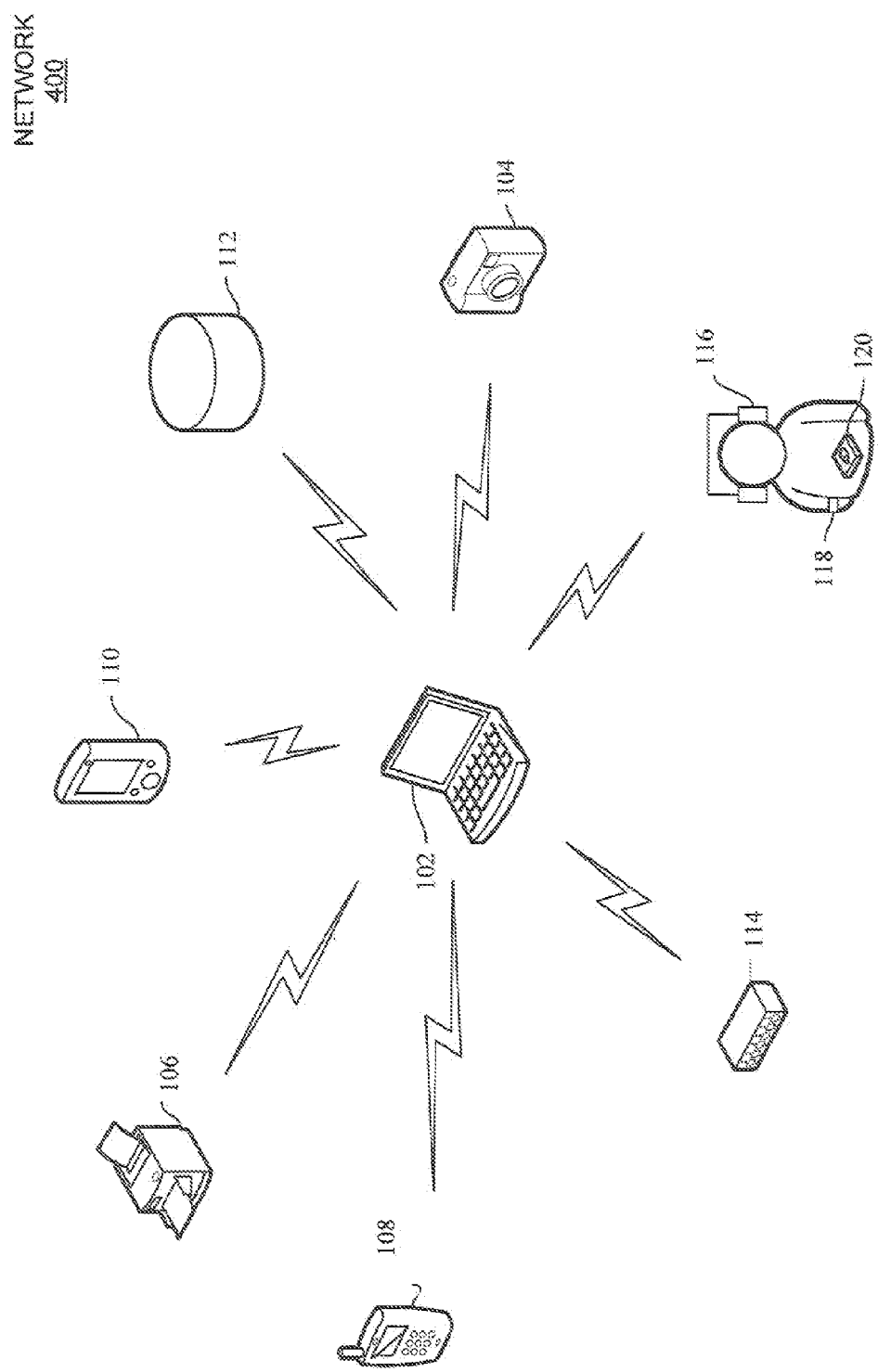
FIG. 4 is a diagram of a wireless communications network configured in accordance with an aspect of the disclosure.

FIG. 3 illustrates a second preamble transmission and detection scheme 300 in accordance with an aspect of the disclosure, where the transmissions are separated by a period of silence and the scans begin somewhere in the transmission, and extend into the silence periods. This is different from FIG. 1, where the scans begin after the transmission and fall entirely in the silence periods An example of a short range communications network suitable for supporting one or more aspects presented throughout this disclosure is illustrated in FIG. 4. The network 400 is shown with various wireless nodes that communicate using any suitable radio technology or wireless protocol. By way of example, the wireless nodes may be configured to support Ultra-Wideband (UWB) technology. Alternatively, the wireless nodes may be configured to support various wireless protocols such as Bluetooth or IEEE 802.11, just to name a few.

The network 400 is shown with a computer 402 in communication with the other wireless nodes. In this example, the computer 402 may receive digital photos from a digital camera 404, send documents to a printer 406 for printing, synch-up with e-mail on a personal digital assistant (PDA) 408, transfer music files to a digital audio player (e.g., MP3 player) 410, back up data and files to a mobile storage device 412, and communicate with a remote network (e.g., the Internet) via a wireless hub 414. The network 400 may also include a number of mobile and compact nodes, either wearable or implanted into the human body. By way of example, a person may be wearing a headset 416 (e.g., headphones, earpiece, etc.) that receives streamed audio from the computer 402, a watch 418 that is set by the computer 402, and/or a sensor 420 which monitors vital body parameters (e.g., a biometric sensor, a heart rate monitor, a pedometer, and EKG device, etc.).

Although shown as a network supporting short range communications, aspects presented throughout this disclosure may also be configured to support communications in a wide area network supporting any suitable wireless protocol, including by way of example, Evolution-Data Optimized (EV-DO), Ultra Mobile Broadband (UMB), Code Division Multiple Access (CDMA) 2000, Long Term Evolution (LTE), or Wideband CDMA (W-CDMA), just to name a few. Alternatively, the wireless node may be configured to support wired communications using cable modem, Digital Subscriber Line (DSL), fiber optics, Ethernet, HomeRF, or any other suitable wired access protocol.

In some aspects a wireless device may communicate via an impulse-based wireless communication link. For example, an impulse-based wireless communication link may utilize ultra-wideband pulses that have a relatively short length (e.g., on the order of a few nanoseconds or less) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a monitor that may receive data from the medical or environment sensing device, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

Various aspects or features will be presented in terms of systems that may include a number of devices, components, modules, and the like. It is to be understood and appreciated that the various systems may include additional devices, components, modules, etc., and/or may not include all of the devices, components, modules etc. discussed in connection with the figures. A combination of these approaches may also be used. As those skilled in the art will readily appreciate, the aspects described herein may be extended to any other apparatus, system, method, process, device, or product.

Figure 5:
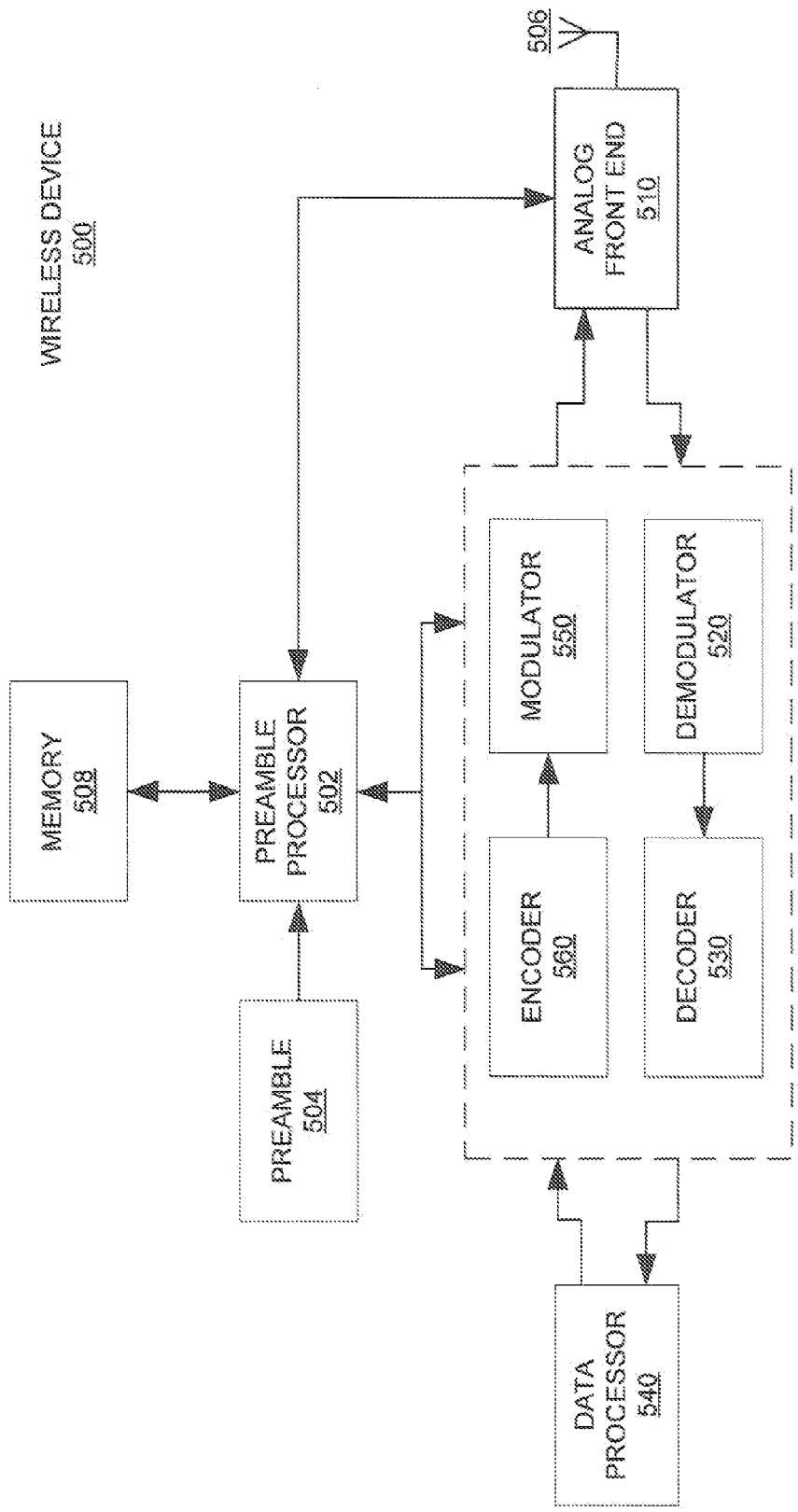
FIG. 5 is a wireless node that includes a front end processing system in a wireless node in the wireless communications network of FIG. 4.

FIG. 5 is a conceptual block diagram of a wireless device 500 illustrating an example of the signal processing functions of the PHY layer. In a receive mode, an analog front end 510 receives data from an antenna 506. The signal is often modulated (e.g., Turbo code) to facilitate Forward Error Correction (FEC) at the receiving node. The signal from the analog front end may be provided to a demodulator 520. The demodulator 520 combines the modulation symbols into a single stream. The stream is then sent to a decoder 530. Once decoded, the stream is sent to a data processor 540, which may be used to translate the modulation symbols back to the correct point in the signal constellation. In a transmit mode, an encoder 560 and a modulator 550 are used to implement the reverse operation of decoder 530 and demodulator 520, respectively. Specifically, the encoder 560 and the modulator 550 receive a stream from the data processor 540 to encode and create modulation symbols to send to the analog front end 510.

The wireless device includes a preamble processor 502 that will use a stored preamble 504 for the operation of the demodulator 520 and the decoder 530 for the receive operation, and the encoder 560 and the modulator 550 for the transmit operation. For example, the stored preamble 504 may be transmitted during the acquisition process to another wireless device using the encoder 560 and the modulator 550. A memory 508 is attached to the preamble processor 502 and may be used to store information necessary for the acquisition process and communication process in general. For example, during a pairing operation where the wireless device is on the preamble receipt side, the memory 508 may be used to store the received samples of the preamble to test hypotheticals.

Figure 6:
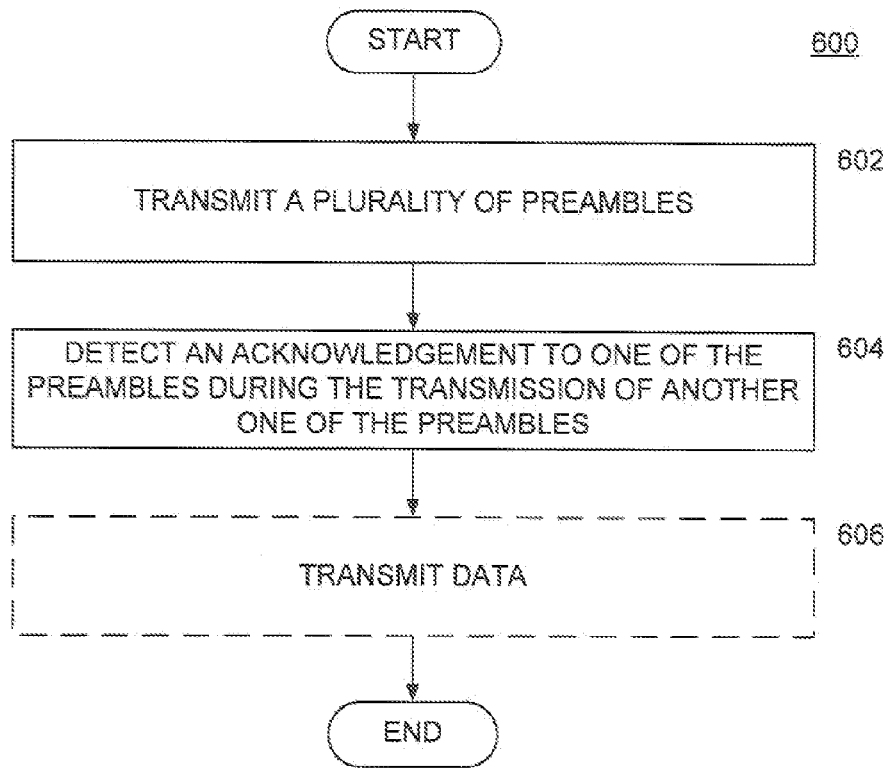
FIG. 6 is a flow diagram illustrating the operation of an acknowledgment detection during preamble transmission scheme configured in accordance with one aspect of the disclosure.

FIG. 6 illustrates a process 600 implemented by a wireless device for acknowledgment detection during preamble transmission where, in step 602, the wireless device transmits a plurality of preambles. In one aspect of the disclosure, the preambles are transmitted continuously without any gaps between transmissions. However, a distance is inserted between each pulse of a preamble, even though the preambles are transmitted continuously without any gap between transmissions. In step 604, the wireless device will detect an acknowledgement to one of the preambles during the transmission of another one of the preambles. In step 606, if the wireless device detects an acknowledgement, then it will continue to transmit the data portion of the packet. In one aspect of the disclosure, step 606 is performed when the data portion of the packet needs to be transmitted.

Figure 7:
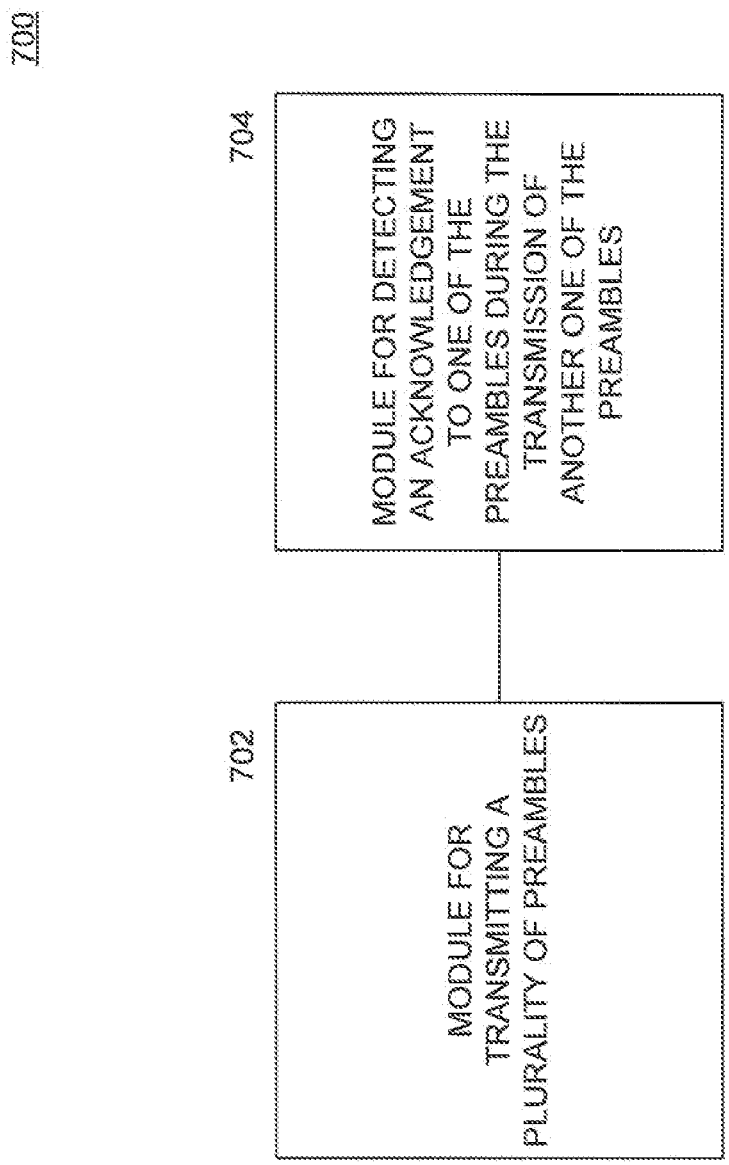
FIG. 7 is a block diagram illustrating the functionality of an apparatus for implementing acknowledgment detection during preamble transmission in accordance with one aspect of the disclosure.

FIG. 7 is a diagram illustrating the functionality of an apparatus 700 in accordance with one aspect of the disclosure. The apparatus 700 includes a module 702 for transmitting a plurality of preambles; and a module 704 detecting an acknowledgement to one of the preambles during the transmission of another one of the preambles.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Those skilled would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the aspects disclosed herein.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the aspects disclosed herein. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects disclosed herein. In some aspects a computer program product may comprise packaging materials.

The previous description is provided to enable any person skilled in the art to understand fully the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Further, the phrase "at least one of a, b and c" as used in the claims should be interpreted as a claim directed towards a, b or c, or any combination thereof. Unless specifically stated otherwise, the terms "some" or "at least one" refer to one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for wireless communication comprising:
    transmitting a plurality of preambles, wherein each of the preambles is configured to solicit a defined acknowledgement when detected by a remote device; and
    receiving the defined acknowledgement to one of the preambles from the remote device during the transmission of another one of the preambles, wherein each preamble comprises a first sequence of pulses and the defined acknowledgement comprises a second sequence of pulses, and wherein receiving the defined acknowledgement during the transmission of the another one of the preambles comprises receiving pulses of the second sequence in between transmission of pulses of the first sequence of pulses.

2. The method of claim 1, wherein the transmission comprises continuously transmitting the plurality of preambles.

3. The method of claim 1, wherein the one of the preambles and the another one of the preambles are identical.

4. The method of claim 1, wherein the first sequence of pulses and the second sequence of pulses are partially overlapping.

5. An apparatus for wireless communications, comprising:
    a processing system configured to:
        transmit a plurality of preambles, wherein each of the preambles is configured to solicit a defined acknowledgement when detected by a remote device; and
        receiving the defined acknowledgement to one of the preambles from the remote device during the transmission of another one of the preambles, wherein each preamble comprises a first sequence of pulses and the defined acknowledgement comprises a second sequence of pulses, and wherein receiving the defined acknowledgement during the transmission of the another one of the preambles comprises receiving pulses of the second sequence in between transmission of pulses of the first sequence of pulses.

6. The apparatus of claim 5, wherein the transmission comprises continuously transmitting the plurality of preambles.

7. The apparatus of claim 5 wherein the one of the preambles and the another one of the preambles are identical.

8. An apparatus for wireless communications, comprising:
    means for transmitting a plurality of preambles, wherein each of the preambles is configured to solicit a defined acknowledgement when detected by a remote device; and
    means for receiving the defined acknowledgement to one of the preambles from the remote device during the transmission of another one of the preambles, wherein each preamble comprises a first sequence of pulses and the defined acknowledgement comprises a second sequence of pulses, and wherein receiving the defined acknowledgement during the transmission of the another one of the preambles comprises receiving pulses of the second sequence in between transmission of pulses of the first sequence of pulses.

9. The apparatus of claim 8, wherein the transmission means comprises means for continuously transmitting the plurality of preambles.

10. The apparatus of claim 8, wherein the one of the preambles and the another one of the preambles are identical.

11. The apparatus of claim 8, wherein the first sequence of pulses and the second sequence of pulses are partially overlapping.

12. A computer-program product for wireless communications, comprising:
a computer-readable storage device comprising instructions executable by a processor to:
transmit a plurality of preambles, wherein each of the preambles is configured to solicit a defined acknowledgement when detected by a remote device; and
receiving the defined acknowledgement to one of the preambles from the remote device during the transmission of another one of the preambles, wherein each preamble comprises a first sequence of pulses and the defined acknowledgement comprises a second sequence of pulses, and wherein receiving the defined acknowledgement during the transmission of the another one of the preambles comprises receiving pulses of the second sequence in between transmission of pulses of the first sequence of pulses.

13. A sensing device comprising:
a sensor configured to generate sensed data; and
a processing system coupled to the sensor, and configure to:
transmit a plurality of preambles, wherein each of the preambles is configured to solicit a defined acknowledgement when detected by a remote device; and
receive the defined acknowledgement to one of the preambles from the remote device during the transmission of another one of the preambles to establish communications for subsequent communication of the sensed data, wherein each preamble comprises a first sequence of pulses and the defined acknowledgement comprises a second sequence of pulses, and wherein receiving the defined acknowledgement during the transmission of the another one of the preambles comprises receiving pulses of the second sequence in between transmission of pulses of the first sequence of pulses.

14. A headset comprising:
a transducer; and
a processing system coupled to the transducer and configured to:
transmit a plurality of preambles, wherein each of the preambles is configured to solicit a defined acknowledgement when detected by a remote device; and
receive the defined acknowledgement to one of the preambles from the remote device during the transmission of another one of the preambles to establish communications for subsequent communication of data usable by the transducer, wherein each preamble comprises a first sequence of pulses and the defined acknowledgement comprises a second sequence of pulses, and wherein receiving the defined acknowledgement during the transmission of the another one of the preambles comprises receiving pulses of the second sequence in between transmission of pulses of the first sequence of pulses.

* * * * *